(12) United States Patent
Burdock

(10) Patent No.: US 6,752,401 B2
(45) Date of Patent: Jun. 22, 2004

(54) VEHICLE ROLL CONTROL

(75) Inventor: William Burdock, Sutton Coldfield (GB)

(73) Assignee: Land Rover, Warwick (GB)

(*) Notice: Subject to any disclaimer, the term of this patent is extended or adjusted under 35 U.S.C. 154(b) by 0 days.

(21) Appl. No.: 10/412,797

(22) Filed: Apr. 11, 2003

(65) Prior Publication Data

US 2003/0189300 A1 Oct. 9, 2003

Related U.S. Application Data

(62) Division of application No. 09/806,256, filed as application No. PCT/GB99/03061 on Sep. 15, 1999.

(30) Foreign Application Priority Data

Sep. 29, 1998 (GB) ............................................. 9821062

(51) Int. Cl.⁷ ............................................. B60G 17/01
(52) U.S. Cl. .................................................. 280/5.508
(58) Field of Search ........................... 280/5.508, 5.51, 280/5.54, 124.107

(56) References Cited

U.S. PATENT DOCUMENTS

| | | | |
|---|---|---|---|
| 4,600,215 A | * | 7/1986 | Kuroki et al. ............ 280/5.519 |
| 4,616,848 A | * | 10/1986 | Sugasawa et al. ........ 280/5.518 |
| 4,717,173 A | * | 1/1988 | Sugasawa et al. ........ 280/5.518 |
| 4,722,547 A | * | 2/1988 | Kishi et al. .................... 367/96 |
| 4,733,883 A | * | 3/1988 | Sugasawa et al. ........ 280/5.513 |
| 4,741,554 A | * | 5/1988 | Okamoto ................. 280/5.513 |
| 4,749,210 A | * | 6/1988 | Sugasawa ................ 280/5.519 |
| 4,827,416 A | * | 5/1989 | Kawagoe et al. ............. 701/38 |
| 4,834,419 A | | 5/1989 | Kozaki et al. |
| 4,852,903 A | | 8/1989 | Tanaka et al. |
| 4,903,982 A | | 2/1990 | Harara et al. |
| 4,903,983 A | | 2/1990 | Fukushima et al. |
| 4,927,173 A | | 5/1990 | Clifton, Jr. |
| 4,930,082 A | | 5/1990 | Harara et al. |
| 4,953,890 A | | 9/1990 | Kamimura |
| 4,986,388 A | | 1/1991 | Matsuda |
| 4,989,466 A | | 2/1991 | Goodman |
| 5,013,062 A | * | 5/1991 | Yonekawa et al. ........ 280/5.503 |
| 5,243,525 A | * | 9/1993 | Tsutsumi et al. ............. 701/37 |
| 5,322,320 A | | 6/1994 | Sahashi et al. |
| 5,362,094 A | | 11/1994 | Jensen |
| 5,381,335 A | | 1/1995 | Wolf |
| 5,422,810 A | | 6/1995 | Brunning et al. |
| 5,430,647 A | | 7/1995 | Raad et al. |
| 5,481,459 A | | 1/1996 | Bungeler |
| 5,487,006 A | | 1/1996 | Kakizaki et al. |
| 5,510,986 A | * | 4/1996 | Williams ...................... 701/38 |
| 5,510,989 A | | 4/1996 | Zabler et al. |
| 5,513,108 A | | 4/1996 | Kishimoto et al. |
| 6,007,072 A | * | 12/1999 | Yoon ....................... 280/5.514 |
| 6,588,769 B2 | * | 7/2003 | Burdock .................. 280/5.508 |

FOREIGN PATENT DOCUMENTS

| | | | |
|---|---|---|---|
| EP | 0 167 159 | 1/1986 | ........... B60G/23/00 |
| EP | 0 465 849 A2 | 1/1992 | ......... B60G/17/015 |
| GB | 2 209 506 A | 5/1989 | ........... B60G/21/06 |
| GB | 2 214 473 A | 9/1989 | ........... B60G/21/06 |

\* cited by examiner

*Primary Examiner*—Lesley D. Morris
*Assistant Examiner*—Paul Royal, Jr.
(74) *Attorney, Agent, or Firm*—Davis & Bujold PLLC

(57) ABSTRACT

A vehicle roll control system uses two accelerometers (38, 40) on the vehicle to detect body roll and then filters out higher frequency roll movements as indicative of a rough road surface. The system also monitors vehicle speed, and increases roll stiffness in response to measured increase in vehicle speed, but decreases roll stiffness in response to detected rough road surfaces.

7 Claims, 3 Drawing Sheets

VEHICLE ROLL CONTROL

This application is a divisional of Ser. No. 09/806,256 filed Mar. 27, 2001, now U.S. Pat. No. 6,588,769 which is a national stage of PCT application No. PCT/GB99/03061 filed on Sep. 15, 1999.

BACKGROUND OF THE INVENTION

The present invention relates to active suspension systems for vehicles, and in particular to such systems which include active roll control.

It is known from U.S. Pat. No. 5,487,006 to provide a vehicle suspension system in which a single lateral accelerometer is used to give an indication of the nature of the surface over which the vehicle is travelling. However this system suffers from the disadvantage that it cannot clearly distinguish between lateral acceleration of the whole vehicle, and lateral acceleration caused by body roll produced by a rough road surface.

The present invention provides apparatus for detecting the roughness of a surface over which a vehicle is travelling, the apparatus comprising roll detection means for measuring roll movements of the vehicle, filtering means for detecting high frequency roll movements, and control means arranged to measure the said roughness by measuring the level of said high frequency roll movements.

DESCRIPTION OF THE INVENTION

Preferably the roll detection means comprises a pair of accelerometers located on the sprung part of the vehicle at different distances from the roll axis of the vehicle.

Preferably the accelerometers are vertically spaced and each accelerometer is arranged to detect acceleration in a direction which is lateral to the vehicle.

Preferably the control means is arranged to monitor the measured acceleration from each of the accelerometers, to produce a roll signal dependent on the difference between the two measured accelerations said roll signal being indicative of instantaneous vehicle roll.

Preferably said difference is an integral over time of the instantaneous difference between the measured accelerations, or the difference between respective integrals over time of the two measured accelerations.

The present invention further provides a vehicle suspension system including apparatus according to the invention wherein the control means is arranged to control the roll stiffness of the vehicle, and is arranged to reduce the roll stiffness of the vehicle in response to the detection of increased surface roughness.

Preferably the system further comprises vehicle speed detection means wherein the control means is arranged to increase the roll stiffness in response to increasing vehicle speed.

The present invention also provides a vehicle suspension system comprising roll control means for controlling the roll stiffness of the vehicle, roughness measuring means for measuring the roughness of the surface over which the vehicle is travelling, vehicle speed measuring means for measuring the speed of the vehicle wherein the roll control means is arranged to increase the roll stiffness if the vehicle speed increases but to decrease the roll stiffness of the roughness of the surface over which the vehicle is travelling increases.

BRIEF DESCRIPTION OF THE DRAWINGS

Preferred embodiments of the present invention will now be described by way of example only with reference to the accompanying drawings in which.

DETAILED DESCRIPTION OF THE INVENTION

Figure 1:
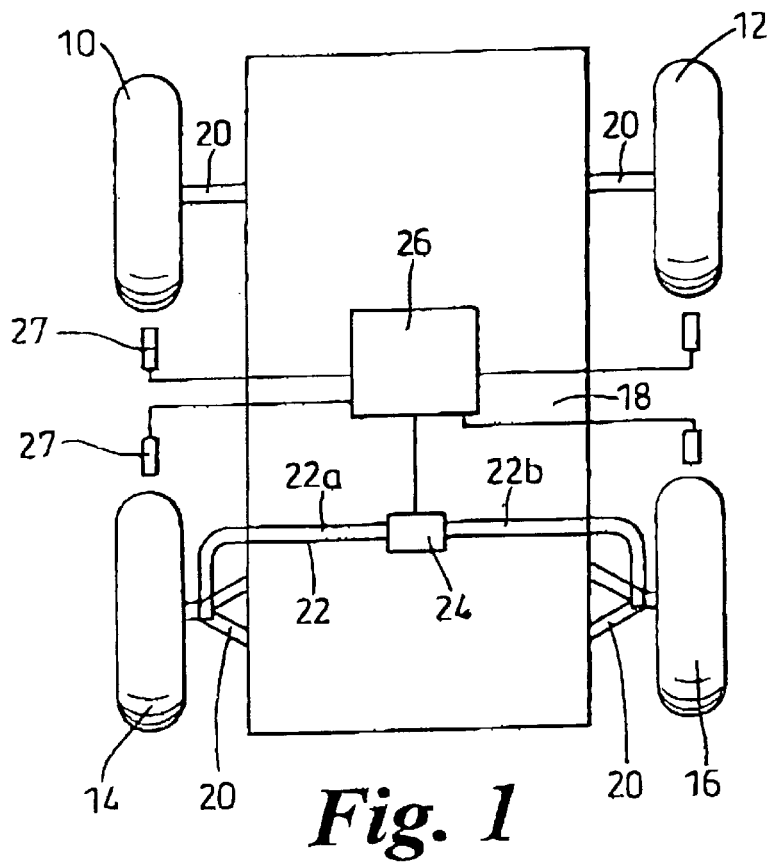
FIG. 1 is a diagrammatic representation of a vehicle including a suspension according to an embodiment of the invention.

Referring to FIG. 1, a vehicle has four wheels 10, 12, 14, 16 each mounted on the vehicle body 18. The vehicle has an independent suspension, each of the wheels being attached to the body 18 which forms the sprung part of the vehicle, through a suspension arm 20 so that it can move vertically relative to the body 18. A roll bar 22 is connected between the two rear wheels 14, 16 to control the roll of the rear of the vehicle. The roll bar 22 is split in the middle into two halves 22a, 22b which can be rotated relative to each other by a rotary actuator 24 under the control of a control unit 26. This enables vehicle roll to be controlled actively in response to signals input to the control unit from wheel speed sensors 27 and a number of accelerometers which provide signals indicative of the acceleration of parts of the vehicle body in various directions. A similar roll bar, which is not shown, would also normally be connected between the front wheels 10, 12.

Figure 2:
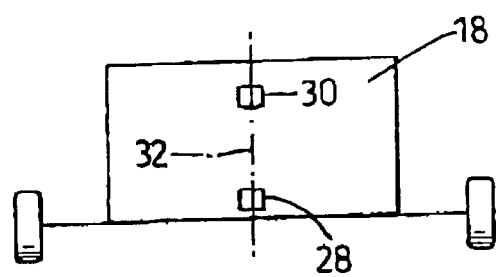
FIGS. 2 and 3 are diagrammatic end views of the vehicle of FIG. 1 when level and when under roll respectively.
Figure 3:
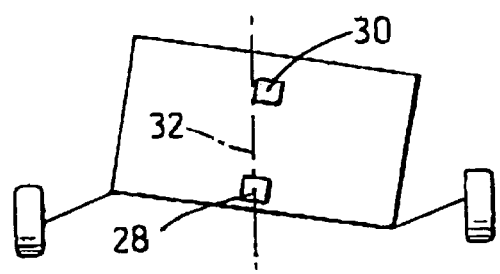

Referring to FIG. 2 the accelerometers mentioned above include two lateral accelerometers 28, 30 which are rigidly mounted on the vehicle body 18 and measure lateral acceleration of the vehicle body. The lateral accelerometers 28, 30 are vertically spaced from each other, the lower one 28 being positioned near the roll axis 32 of the vehicle, i.e. the longitudinal axis about which the vehicle tends to rotate during roll movements. The upper accelerometer 30 is mounted near the top of the vehicle body 18 further from the roll axis 32. Therefore roll of the vehicle body 18 about the roll axis will cause larger lateral movements of the upper accelerometer 30 than of the lower 28.

Figure 4:
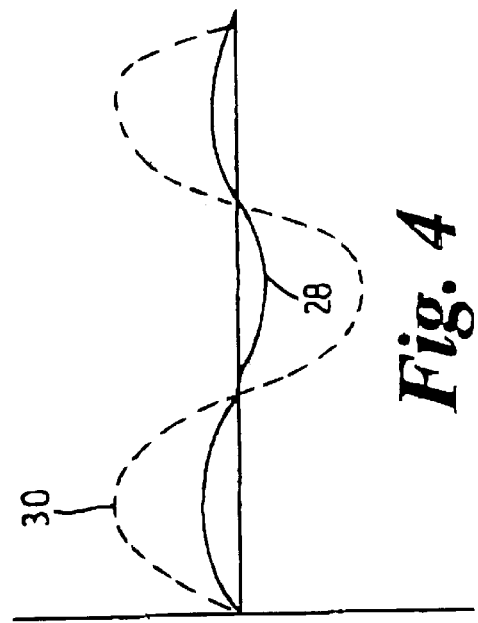
FIG. 4 is a graph showing the output from sensors in the vehicle of FIG. 1 when travelling on a rough road.

FIG. 4 shows the signals produced when the vehicle is traveling over rough ground and the body is rolling at relatively high frequencies of the order of 10 Hz. Under these conditions the upper accelerometer 30 will detect relatively high accelerations because the top part of the body which is relatively for from the roll axis, typically 1.0 to 1.5 meters, will be moving through relatively large distances as the body rolls about the roll axis. The lower accelerometer 28, on the other hand, which is closer to the roll axis, say 0.1 or 0.2 meters above it, will detect much lower accelerations because of the smaller lateral displacements it will undergo. However it will be understood that, as shown in FIG. 4, the oscillations in the two signals will be in phase with each other provided the accelerometers are both above the roll axis. (If the lower accelerometer were below the roll axis they would be in anti-phase.) The signals from the two accelerometers can therefore be analysed by the control unit to determine the amount of vehicle roll.

Figure 5:
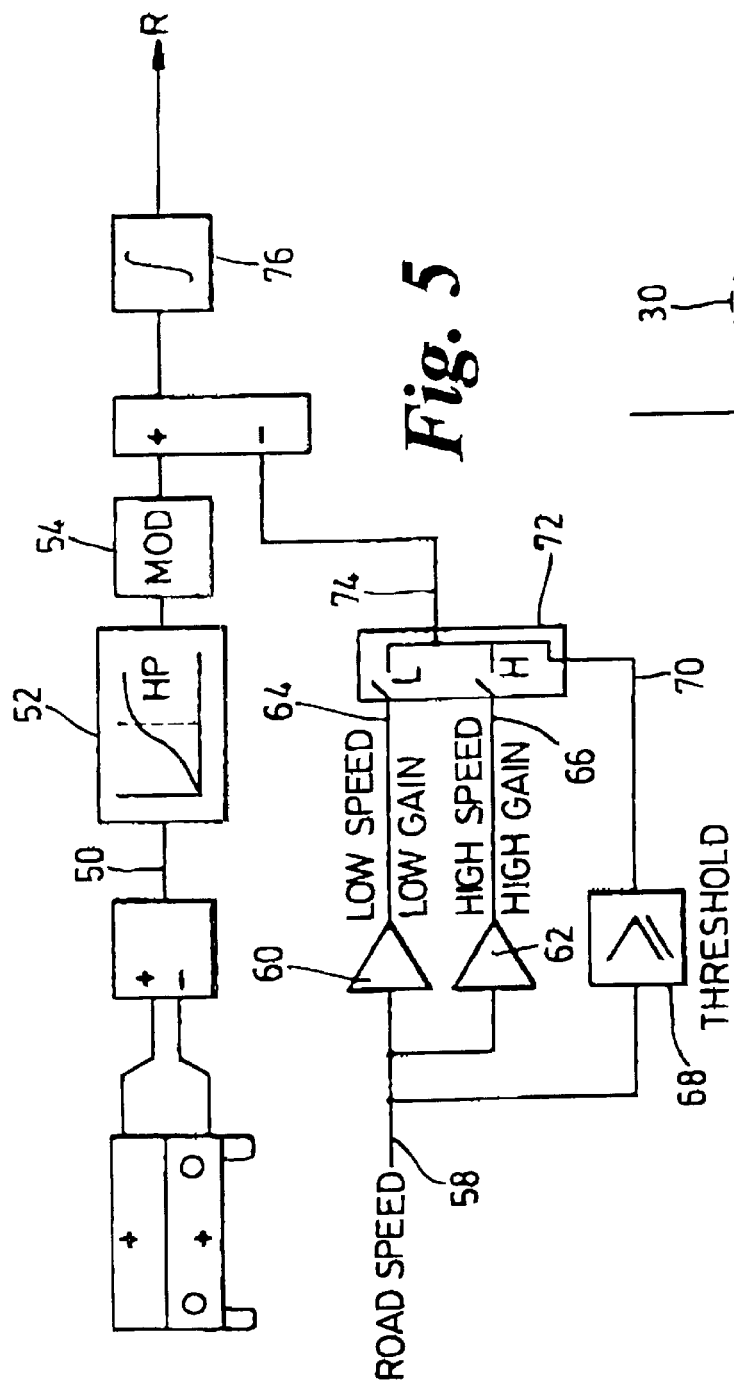
FIG. 5 is a diagrammatic representation of the rough road detection algorithm used in the system of FIG. 1.

Referring to FIG. 5, in order to determine the roughness of the surface or road over which the vehicle is travelling, the difference between the signals from the upper and lower accelerometers 28, 80 is used to produce a difference signal 50. This signal is then filtered using a high pass filter 52 and the modulus of the filtered signal produced at 54. This modulus signal is therefore an indication of the instantaneous amount of body roll at the high frequencies generally indicative of a rough surface. These frequencies will depend on the type of surface which is of interest, and will generally be of the order of 10 to 100 Hz.

A road speed signal 58 which increases with the road speed of the vehicle is passed through a low gain amplifier 60 and a high gain amplifier 62 to produce low gain and high gain speed signals 64, 66. A threshold device 68 monitors the vehicle speed signal and provides a relatively high threshold signal 70 if the speed signal exceeds a predetermined threshold. A switch unit 72 has an output 74 and connects the low gain speed signal to it if the vehicle speed is below a predetermined speed $V_1$, connects the high gain speed signal to it if the vehicle speed is above the predetermined speed $V_1$, and permanently connects the output from the threshold device to it.

The output from the switching device is compared with the modulus signal and the difference input to an integrator 76. The output of the integrator 76 is, at any time t, the integral over the preceding interval δ of the difference between the modulus signal and the and the output from the switching device.

Figure 6:
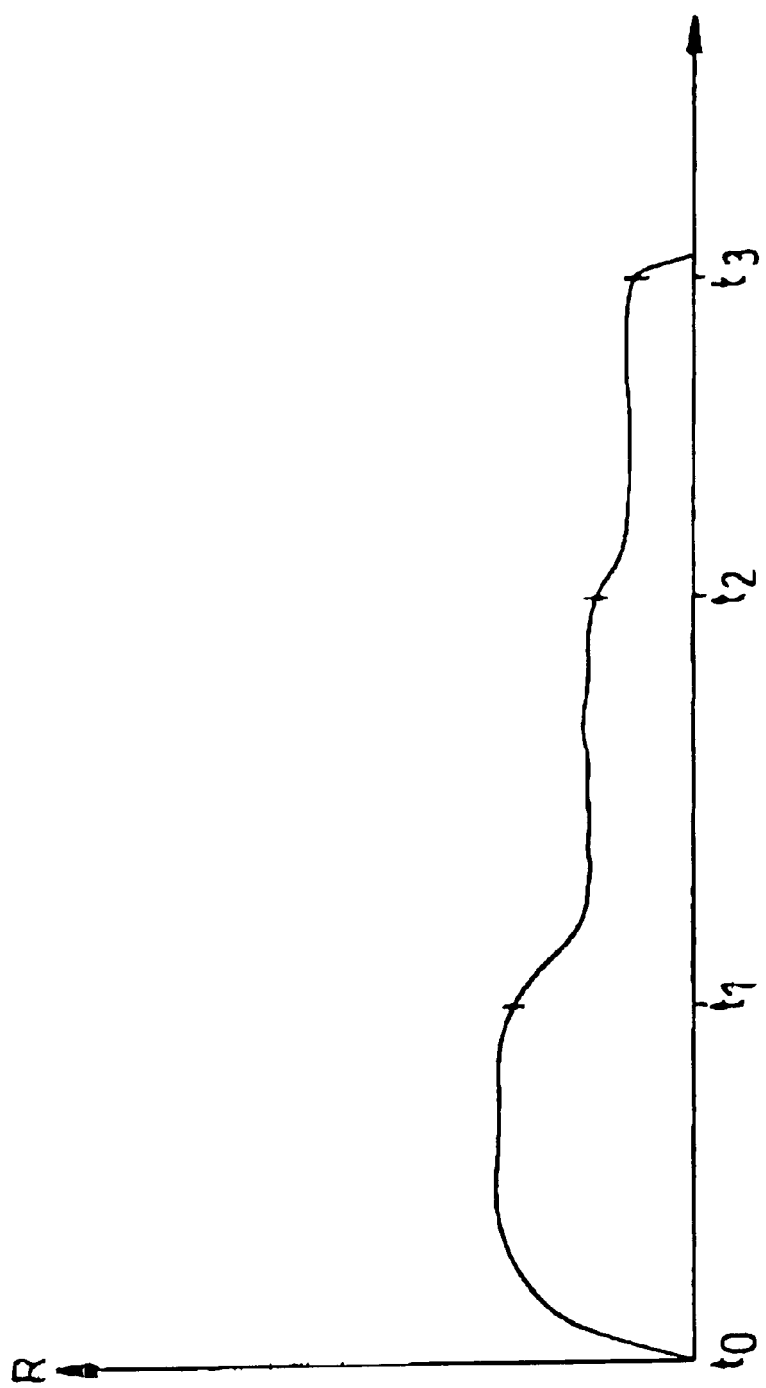
FIG. 6 is a graph showing the output produced by the algorithm of FIG. 5.

The result is that the output R from the integrator 76 will generally increase with road roughness, but will decrease with road speed as is illustrated in FIG. 6, and the control unit can control the roll stiffness of the vehicle in response. From time to the vehicle starts off at low speed on a rough surface. This produces a high output from the integrator 76 which causer the control unit 26 to reduce the roll stiffness of the vehicle to allow the suspension to absorb the vibrations produced by the rough surface. At time $t_1$ the vehicle speed increases above the predetermined speed $V_1$ and the output from the integrator 56 therefore falls. The control unit therefore increases the roll stiffness. At time $t_2$ the road surface becomes smoother so the output from the integrator decreases again, and again the roll stiffness is increased. At time $t_3$ the vehicle speed increases above the threshold speed. The output from the threshold device is therefore input to the integrator 56, the output of which falls rapidly. The roll stiffness is therefore rapidly increased as is suitable for higher speed travel on road.

What is claimed is:

1. A vehicle suspension system comprising a roll controller for controlling the roll stiffness of the vehicle, a roughness sensing system for measuring the roughness of a surface over which the vehicle is traveling, and a vehicle speed sensor for measuring the speed of the vehicle wherein the roll controller is arranged to combine the outputs from the roughness sensing system and the speed sensor to produce an integral over time which will increase in response to an increase in road roughness but decrease in response to increasing vehicle speed, and to increase the roll stiffness of the vehicle in response to a decrease in the integral, but decrease the roll stiffness in response to an increase in the integral.

2. The system according to claim 1 wherein the roughness sensing system comprises at least one accelerometer.

3. The system according to claim 2 for a vehicle having a sprung part and a roll axis, wherein the roughness sensing system comprises a pair of accelerometers located on the sprung part at different distances from the roll axis.

4. The system according to claim 3 wherein the accelerometers are vertically spaced and each accelerometer is arranged to detect acceleration in a direction which is lateral to the vehicle.

5. The system according to claim 1 wherein the controller includes a low gain amplifier and a high gain amplifier and is arranged to receive a vehicle speed signal from the speed sensor and input it to each of the amplifiers, and is arranged to use the output from the low gain amplifier to produce the integral if the vehicle speed is below a predetermined speed, and to use the output from the high gain amplifier to produce the integral of the vehicle speed is above the predetermined speed.

6. A vehicle suspension system comprising roll control means for controlling the roll stiffness of the vehicle, roughness sensing means for measuring the roughness of a surface over which the vehicle is travelling, and a vehicle speed sensing means for measuring the speed of the vehicle wherein the roll controller means is arranged to combine the outputs from the roughness sensing means and the speed sensing means to produce an integral over time which will increase in response to an increase in mad roughness but decrease in response to increasing road speed, and to increase the roll stiffness of the vehicle in response to a decrease in the integral, but decrease the roll stiffness in response to an increase in the integral.

7. A vehicle suspension system comprising a roll controller for controlling the roll stiffness of the vehicle, a roughness sensing system for measuring the roughness of a surface over which the vehicle is traveling, and a vehicle speed sensor for measuring the speed of the vehicle wherein the roll controller is arranged to combine the outputs from the roughness sensing system and the speed sensor to produce an integral over time which will vary in a first manner in response to an increase in road roughness and vary in a second manner in response to increasing road speed, and to decrease the roll stiffness in response to variations in the first manner in the integral, but increase the roll stiffness of the vehicle in response to variations in the second manner in the integral.

* * * * *